UNITED STATES PATENT OFFICE.

ERNST HASSENKAMP, OF ELBERFELD, GERMANY, ASSIGNOR, BY MESNE ASSIGNMENTS, TO EDWARD N. DICKERSON, JR., OF NEW YORK, N. Y.

PRODUCTION OF BLUE-RED AZO DYE-STUFF BY THE ACTION OF TETRAZO-DITOLYL SALTS ON BETA-NAPHTHYLAMINE MONOSULPHO-ACID.

SPECIFICATION forming part of Letters Patent No. 381,132, dated April 17, 1888.

Application filed March 1, 1887. Serial No. 229,338. (Specimens.)

*To all whom it may concern:*

Be it known that I, ERNST HASSENKAMP, a subject of the Emperor of Germany, residing at Elberfeld, in the Empire of Germany, have invented a new and useful Improvement in the Manufacture of Dye-Stuffs or Coloring-Matters, of which the following is a specification.

My invention relates to the production of a new bluish-red azo dye-stuff by the action of tetrazo-ditolyl salts on the alkylated derivates of beta-naphthylamine monosulpho-acid.

In carrying out my process practically I proceed as follows: An aqueous solution of tetrazo ditolyl chloride, formed by diazotizing one hundred kilos tolidine sulphate with one hundred kilos muriatic acid and 44.4 kilos of sodium nitrite, is entered into a solution containing one hundred and eighty kilos of alkyl-naphthylamine monosulpho-acid and two hundred kilos of acetate of soda. After heating the mixture and neutralizing with alkali a color is formed which dyes unmordanted cotton a splendid bluish-red, being fast to diluted acid. A brown-red powder, easily soluble in water, forms the dye-stuff so obtained, which differs materially from the yellowish-red coloring-matter of the benzidine and the beta-naphthylamine monosulpho-acid.

With concentrated sulphuric acid the dye-stuff dissolves into a full blue color.

The formula is as follows:

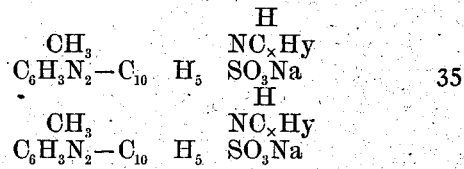

Having thus described my invention, I claim as new and desire to secure by Letters Patent—

The bluish-red coloring-matter hereinbefore described, having the qualities specified, substantially as described.

ERNST HASSENKAMP.

Witnesses:
WM. A. POLLOCK,
H. COUTANT.